(12) United States Patent
Bell et al.

(10) Patent No.: US 8,668,625 B1
(45) Date of Patent: Mar. 11, 2014

(54) CRUISE CONTROL USING PROPULSION AND RETARDING CAPABILITIES OF MACHINE

(71) Applicant: Caterpillar, Inc., Peoria, IL (US)

(72) Inventors: Jason D. Bell, Dahinda, IL (US); Stefan J. Wulf, Washington, IL (US); Daryl R. Brower, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/644,956

(22) Filed: Oct. 4, 2012

(51) Int. Cl.
*B60W 10/18* (2012.01)
*B60T 8/32* (2006.01)
*B60W 30/14* (2006.01)

(52) U.S. Cl.
CPC ................... *B60W 30/143* (2013.01)
USPC ............................. 477/189; 701/93

(58) Field of Classification Search
CPC   B60W 30/14; B60W 30/143; B60W 2540/10
USPC .............. 477/189; 701/93, 110; 123/350, 361
See application file for complete search history.

(56) References Cited

U.S. PATENT DOCUMENTS

| | | | | |
|---|---|---|---|---|
| 4,615,409 A * | 10/1986 | Kupper et al. | ................. | 180/176 |
| 6,122,588 A * | 9/2000 | Shehan et al. | ................. | 701/93 |
| 6,192,860 B1 * | 2/2001 | Hatlen | ......................... | 123/352 |
| 6,256,571 B1 * | 7/2001 | Fischer et al. | ................. | 303/155 |
| 6,283,240 B1 | 9/2001 | Beever | | |
| 7,703,563 B2 * | 4/2010 | Aldrich et al. | ............ | 180/65.265 |
| 7,706,953 B1 * | 4/2010 | Sun | ................................. | 701/93 |
| 8,005,588 B2 * | 8/2011 | Dower | .......................... | 701/22 |
| 8,082,089 B2 | 12/2011 | Morgan et al. | | |
| 8,433,494 B2 * | 4/2013 | Vogel | ............................. | 701/93 |
| 2010/0056337 A1 * | 3/2010 | Huang | .......................... | 477/189 |

* cited by examiner

*Primary Examiner* — Dirk Wright
(74) *Attorney, Agent, or Firm* — Miller, Matthias & Hull

(57) ABSTRACT

A method and system for managing cruise control in a machine provide for maintaining a speed of the machine at a target speed in the absence of an acceleration or deceleration command from an operator of the machine. When a deceleration command is received from the operator of the machine the machine is slowed below the target speed while the deceleration command is received and is returned to the target speed when the deceleration command is no longer received.

20 Claims, 4 Drawing Sheets

CRUISE CONTROL USING PROPULSION AND RETARDING CAPABILITIES OF MACHINE

TECHNICAL FIELD OF THE DISCLOSURE

The present disclosure relates to cruise control for machines and, more particularly, relates to a system and method for controlling machine speed including employing a retarding lever to momentarily change a cruise control speed.

BACKGROUND OF THE DISCLOSURE

During the use of large industrial machines such as trucks and haulers, the workload on the operator can become excessive if the operator is required to control too many aspects of the machine's operation. One aspect of machine operation is machine speed during transportation from one point, such as a mine, to another point, such as a point for offloading material.

To ease the control of machine speed during such times, it is possible to use a cruise control function to set the machine to travel at a certain speed without requiring further user input. For example, U.S. Pat. No. 8,082,089 describes a cruise control system that maintains a machine's speed by selectively actuating a brake of the machine to slow the machine to a target speed. However, it is not always desirable to maintain a constant cruise speed. For example, the roadway may curve or become rough, and some user control of speed without requiring full user speed control may be desirable, yet current cruise control systems typically shut off when the operator brakes the machine.

The present disclosure is directed to systems and methods that address one or more of the problems set forth above. However, it should be appreciated that the solution of any particular problem is not a limitation on the scope of this disclosure or of the attached claims except to the extent expressly noted. Additionally, the inclusion of any problem or solution in this Background section is not an indication that the problem or solution represents known prior art except as otherwise expressly noted.

SUMMARY OF THE DISCLOSURE

In accordance with one aspect of the present disclosure, a method provides cruise control for a machine having retarding and accelerating user interface elements for use by an operator. The method includes receiving an activation of a machine cruise control system and a setting of a target speed for the machine, and in response to receipt of the activation of the machine cruise control system and the setting of a target speed maintaining the machine speed at the target speed. It is detected that the operator of the machine is actuating the retarding user interface element and in response to detecting that the operator of the machine is actuating the retarding user interface element, the machine is slowed below the target speed by an amount based on an extent to which the operator of the machine has actuated the retarding user interface element. Upon detecting that the operator of the machine is no longer actuating the retarding user interface element, the machine speed is returned to the target speed.

In accordance with another aspect of the present disclosure, a system is disclosed for providing cruise control for a machine. The system includes a retarding lever for slowing the machine and a throttle pedal for accelerating the machine as well as a user interface module configured to allow an operator to activate or deactivate a cruise control mode. A cruise control module is configured to maintain a speed of the machine substantially at a target speed when cruise control mode is activated except when the operator depresses one of the retarding lever and the throttle pedal. When the operator depresses the retarding lever, the machine is slowed below the target speed, and is returned to the target speed when the operator releases the retarding lever. When the operator depresses the throttle pedal, the machine is accelerated above the target speed, and is returned to the target speed when the operator releases the throttle pedal.

In accordance with yet another aspect of the present disclosure, a method of controlling a machine speed while in cruise control includes maintaining a speed of the machine at a target speed in the absence of an acceleration or deceleration command from an operator of the machine. When a deceleration command is received from the operator of the machine the machine is slowed below the target speed while the deceleration command is received and is returned to the target speed when the deceleration command is no longer received.

Other features and advantages of the disclosed systems and principles will become apparent from reading the following detailed disclosure in conjunction with the included drawing figures.

DETAILED DESCRIPTION OF THE DISCLOSURE

The present disclosure provides a system and method for allowing a user to temporarily retard the speed of a machine during a period of cruise control, with the target speed being reacquired when the retarding condition is removed. Thus, for example, if an operator has set a machine to cruise at a fixed speed and the roadway begins to curve such that that speed is too high, the operator may actuate the machine retarding lever to slow the machine. The machine will slow during activation of the retarding lever, but will reacquire the target speed once the retarding lever is released. Similarly, the user may accelerate the machine during cruise control via activation of the throttle pedal, with the target speed being reacquired once the throttle pedal is released.

Figure 1:
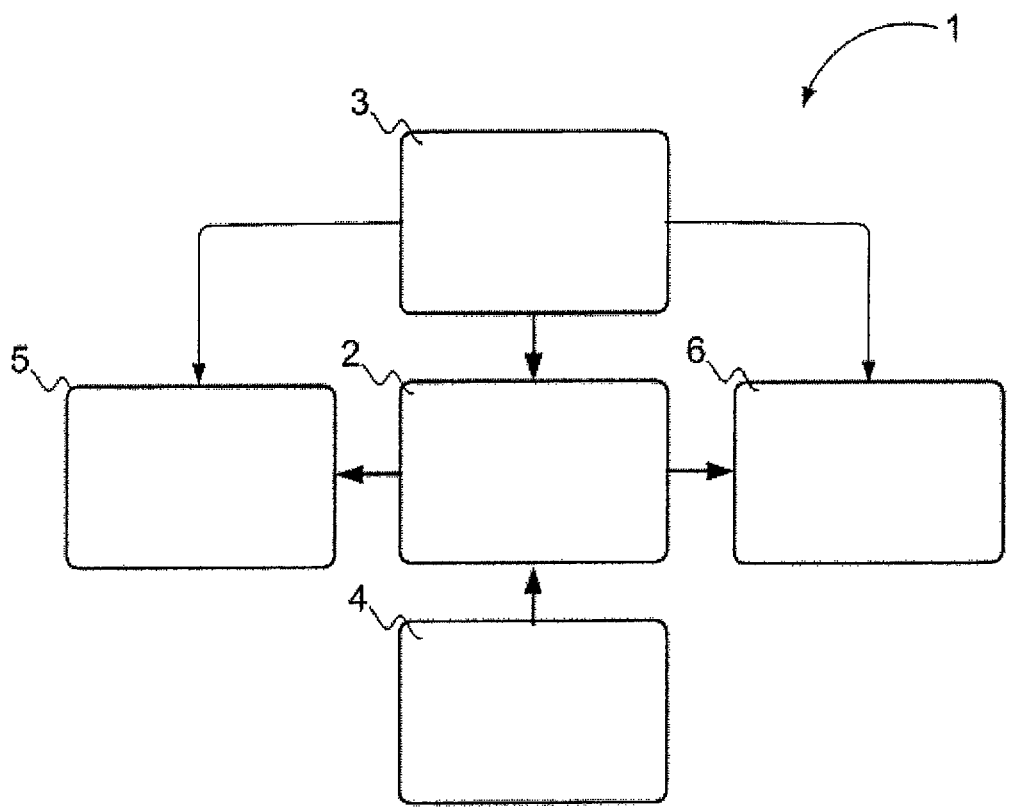
FIG. 1 is a schematic diagram of a cruise control system in accordance with an aspect of the disclosed principles.

Turning to the figures, FIG. 1 is a schematic overview diagram of a cruise control system 1 and associated components in accordance with an aspect of the disclosed principles. In the illustrated embodiment, the cruise control system 1 includes a cruise control module 2 that receives input from and provides input to a number of other modules. The cruise control module 2 as illustrated receives input from a user interface module 3 to control the cruise control function, e.g., setting cruise control on, setting a target speed, turning cruise control off, and so on. As will be discussed in greater detail later, in an embodiment, the user interface module 3 also includes control elements for controlling machine speed, e.g., a retarding lever for slowing the machine, one or more braking levers or pedals, and a throttle pedal or acceleration pedal.

The cruise control module 2 is linked to a speed sensor module 4. The speed sensor module senses or calculates the machine speed and provides this information to the cruise control module 2. The sensed machine speed may be based on the speed of a single wheel or ground-engaging element, or may be based on an average or other combination of a plurality of wheels or ground-engaging elements. For example, the speed sensor module 4 may account for wheel slippage, spinning, or other causes of uneven wheel speed.

The cruise control module 2 is further linked to a machine retarding module 5, which controls a retarding function of the machine. For example, in addition to brakes which provide a braking function, the machine also includes the ability to slow via application of a reactive or negative torque to the wheels or ground-engaging elements. Examples of this include electric motor drives in hybrid machines that extract power from the machine movement by acting as generators rather than motors. The extracted energy may then be stored or dissipated.

In the illustrated embodiment, the cruise control module 2 is also linked to a machine acceleration module 6. The machine acceleration module 6 is configured to accelerate the machine under the control of the cruise control module 2 or upon application of the acceleration pedal by an operator of the machine.

Figure 2:
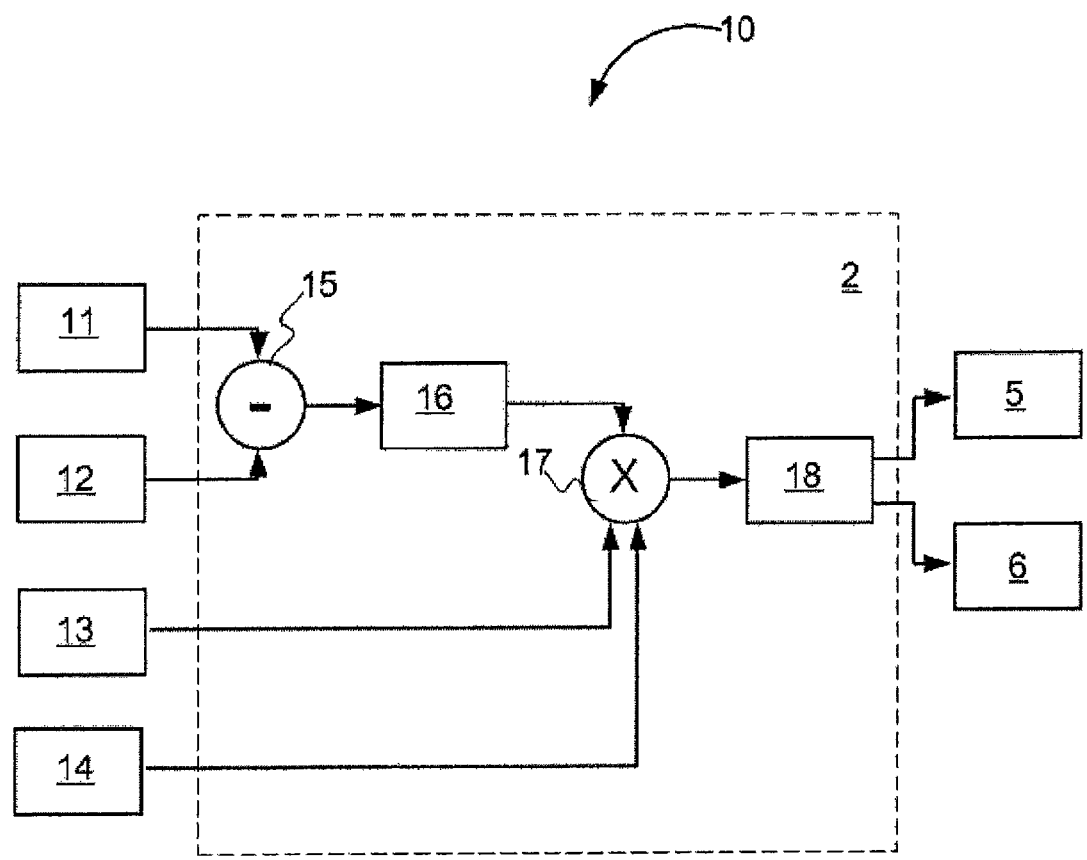
FIG. 2 is a logical diagram of a cruise control system in accordance with an aspect of the disclosed principles.

FIG. 2 is a logical schematic diagram of a cruise control system 10 including the cruise control module 2, showing the operation of the cruise control module 2 in conjunction with various inputs and outputs. The cruise control module 2 takes as inputs a target speed 11 and an actual speed 12. The target speed 11 may be received by the cruise control module 2 from any suitable source, e.g., the user interface module 3 or similar source, and is indicative of a speed at which the operator wishes the machine to cruise. The actual speed 12 may be received from, or derived from information received from, any suitable source, e.g., the speed sensor module 4 or otherwise.

The cruise control module 2 also receives as input a retarding command 13 and an acceleration command 14. In an embodiment, both the retarding command 13 and the acceleration command 14 may be received from the user interface module 3, e.g., via a retarding lever and an acceleration pedal respectively.

In operation, the cruise control module 2 differences the target speed 11 and the actual speed 12 via comparison 15 to produce a speed difference value 16. The speed difference value 16 may be a pure difference, a percentage difference, or any other suitable measure of the difference between the target speed 11 and the actual speed 12.

The speed difference value 16 is offset by one of the retarding command 13 and the acceleration command 14 at multiplier 17. In particular, if one of the retarding command 13 and the acceleration command 14 is nonzero, meaning the operator is attempting to accelerate or retard the machine, the speed difference value 16 is adjusted to zero, e.g., multiplied by zero, to allow for the retarding or acceleration. Otherwise, the speed difference value 16 is multiplied by one.

Thus, for example, if the operator is not commanding any machine retardation or acceleration, then the speed difference value 16 is multiplied by one at multiplier 17 to yield a final speed difference value 18 that matches the speed difference value 16. This value is then used to control the machine retarding module 5 and the machine acceleration module 6. In particular, if the speed difference is positive, indicating that the machine is travelling faster than the target speed, then the machine retarding module 5 may be activated to slow the machine. Similarly, if the speed difference is negative, indicating that the machine is travelling slower than the target speed; then the machine acceleration module 6 may be activated to speed the machine.

However, if the operator is commanding machine retardation or acceleration, then the speed difference value 16 is multiplied by zero at multiplier 17 to yield a final speed difference value 18 of zero. This value of zero means that the machine retarding module 5 and the machine acceleration module 6 are not activated by the cruise control module 2 but rather via the user interface module 3 itself.

As can be seen, as soon as the operator ceases attempting to retard or accelerate the machine, the weighting at multiplier 17 returns to one, again yielding a final speed difference value 18 that matches the speed difference value 16. Although the described example uses a weighting of one and zero, and thus permits control by the operator or the cruise control module but not both at the same time, it is also possible to use more gradual weighting such that control by the operator is merged with control by the cruise control module.

Figure 3:
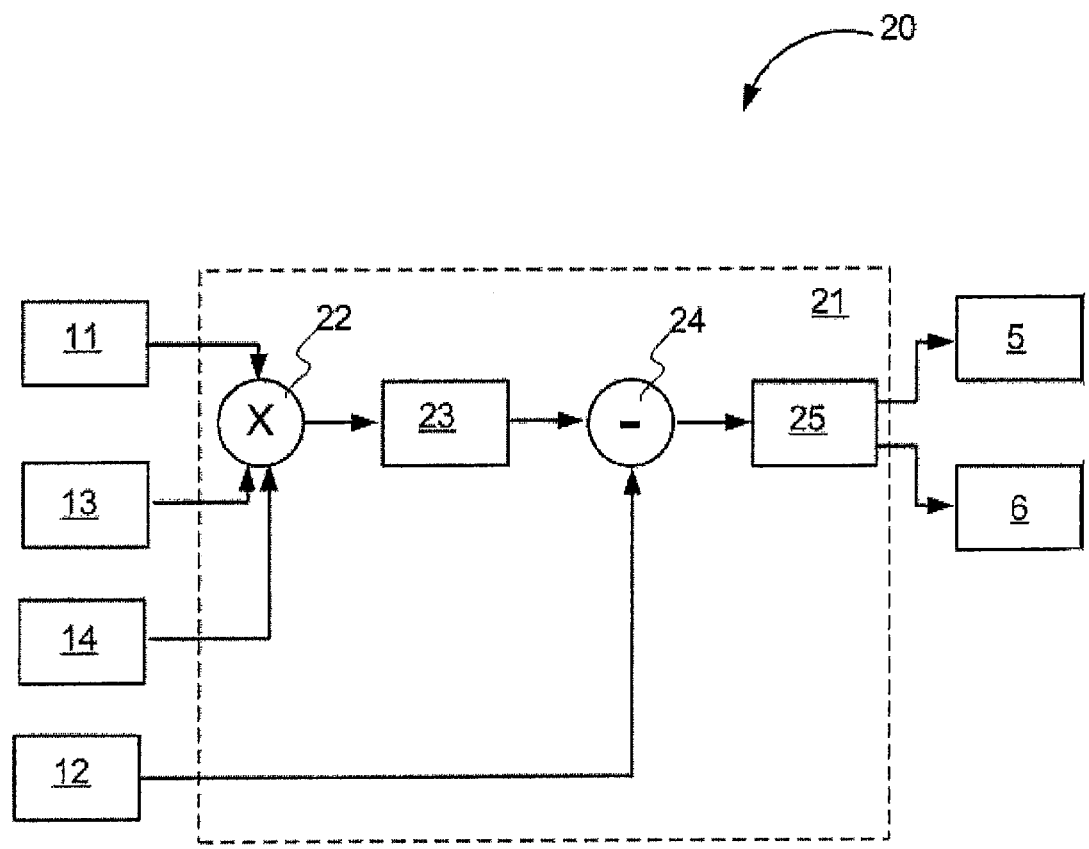
FIG. 3 is a logical diagram of a cruise control system in accordance with another aspect of the disclosed principles.

In another embodiment, the target speed 11 is first weighted by the retarding command 13 and the acceleration command 14. FIG. 3 shows a logical schematic diagram of a cruise control system 20 including a cruise control module 21, showing the operation of the cruise control module 21 in conjunction with various inputs and outputs in this embodiment. As with the prior embodiment, the cruise control module receives a target speed 11, an actual speed 12, a machine retarding command 13 and a machine acceleration command 14, and provides output to a machine retarding module 5 and the machine acceleration module 6.

The target speed 11 is first weighted by the machine retarding command 13 and machine acceleration command 14 at multiplier 22 to produce a weighted target speed value 23. For example, in an embodiment, the target speed 11 is weighted proportionally by the machine retarding command 13 and machine acceleration command 14. In this embodiment, if the retarding lever is pushed to 50% of its range, then the target speed may be weighted by −0.5. Similarly, if the acceleration pedal is pushed to 50% of its range, then the target speed 11 may be weighted by 1.5. In the event that both the retarding lever and acceleration lever are pushed simultaneously, the pushing of the acceleration lever is ignored in an embodiment in preference to the pushing of the retarding lever.

The weighted target speed 23 is differenced from the actual speed 12 at comparison 24 to produce a final speed difference value 25. This value is then used to control the machine retarding module 5 and the machine acceleration module 6. In particular, if the speed difference is positive, indicating that the machine is travelling faster than the target speed, then the machine retarding module 5 may be activated to slow the machine. Similarly, if the speed difference is negative, indicating that the machine is travelling slower than the target speed, then the machine acceleration module 6 may be activated to speed the machine.

Figure 4:
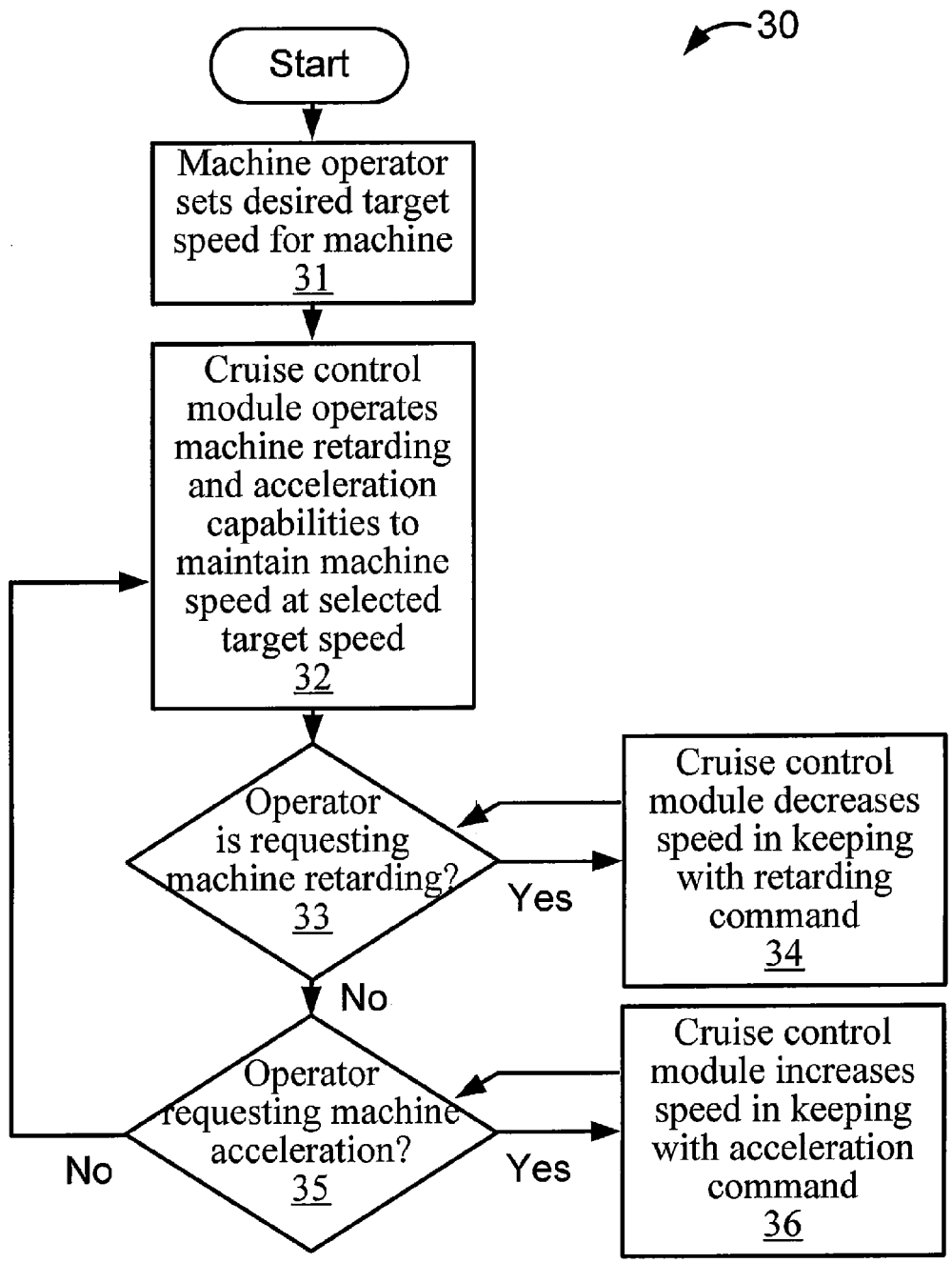
FIG. 4 is a flow chart showing a process of cruise control management in accordance with aspects of the disclosed principles.

In accordance with an implementation of the cruise control module 21 as a processor executing computer-implemented steps, FIG. 4 is a flow chart 30 showing an overview of a process of machine cruise control using machine acceleration and retarding capabilities. At stage 31, the machine operator sets a desired target speed for the machine. The setting of the desired target speed may be by way of a speed selection interface or may be accomplished by activating the cruise control function when the machine is travelling at the desired speed, or by any other suitable mechanism.

At stage 32, the cruise control module 21 operates the machine retarding and acceleration capabilities to maintain the machine speed at the selected target speed. For example, if the machine speed exceeds the selected target speed by more than a predetermined variance, e.g., 1 MPH, then the cruise control module 21 may increase the retarding force to slow the machine, whereas if the machine speed is less than the selected target speed by the predetermined variance, then the cruise control module 21 may increase the driving force to speed the machine up.

The cruise control module 21 checks at stage 33 whether the operator is requesting machine retarding, i.e., by depressing the retarding lever. If the operator is requesting retarding, the cruise control module 21 decreases the speed of the machine in keeping with the retarding command at stage 34. In an embodiment, the decrease in speed is proportional to the amount by which the retarding lever is depressed, e.g., depressing the lever by 50% of its travel would cause the cruise control module 21 to decrease the machine speed by 50%. However, the decrease in speed need not be proportional to the movement of the retarding lever in every embodiment, and it will be appreciated that the decrease may instead be nonlinear.

Once the operator is no longer requesting retarding, or in the event that the operator has not requested retarding, the cruise control module 21 determines at stage 35 whether the operator is requesting machine acceleration, e.g., by depressing the acceleration pedal or the like. If it is determined at stage 35 that the operator is requesting acceleration, the cruise control module 21 increases the speed of the machine via the machine acceleration capabilities at stage 36 in keeping with the degree to which the operator is requesting acceleration. In an embodiment, the machine is accelerated proportionally to the depression of the acceleration pedal, but it will be appreciated that a nonproportional increase may be used instead. When the operator is no longer requesting acceleration, or in the event that the operator has not requested acceleration, the process 30 flows to stage 32 to operate the machine retarding and acceleration capabilities to maintain the machine speed at the selected target speed.

Thus, it will be appreciated that the operator may temporarily change the speed of the machine from the target speed during cruise control by operating user interface elements such as the retarding lever and acceleration pedal. However, once the user releases the retarding lever, acceleration pedal, or other user interface element to modify machine speed, the machine speed is returned to the target speed.

It will be appreciated that the operator may take user interface actions to turn the cruise control function off rather than merely temporarily modify the machine speed. For example, in an embodiment, if the operator actuates the machine service brakes rather than using the retarding lever, this may act to turn the cruise control function off and allow for full user control. Similarly, in an embodiment, a selectable user interface element acts as a switch to turn the cruise control function on and off. This may be a selectable screen element or a physical switch or button.

INDUSTRIAL APPLICABILITY

In general terms, the present disclosure sets forth a system and method applicable to machines and systems that employ cruise control, especially though not exclusively with respect to large trucks and machines used in industrial processes, e.g., mine trucks and similar machines.

In an embodiment, a machine operator is able to set a machine cruise control function to maintain the machine speed at a target speed. The setting of the target speed may be by way of a selection process or may be by way of the operator switching on the cruise control function when the machine is travelling at a desired speed, the speed at which cruise control is switched on becoming the target speed. The user is then able to temporarily vary the machine speed without altering the target speed or turning the cruise control function off.

Thus, for example, the operator may depress the retarding lever while the cruise control function is on and is maintaining the machine speed at the target speed. In response, the cruise control system temporarily retards the machine speed in keeping with the retarding lever command, e.g., proportionally or otherwise in relation to the extent of the command. Similarly, the operator may instead depress the acceleration pedal while the cruise control system is maintaining the machine speed at the target speed. In response, the cruise control system may temporarily increase the machine speed in keeping with the acceleration command, again, proportionally or otherwise.

Once the operator has released the retarding lever or acceleration pedal, the cruise control system again controls the machine speed back to the target speed. This allows the operator to temporarily slow the machine for turns and so on without being required to turn off the cruise control system or to reset the target speed once slowing is no longer required. Similarly, the operator may accelerate the machine, e.g., during a particularly long straight section, without being required to turn off the cruise control system or to reset the target speed once the increased speed is no longer required.

While only certain embodiments have been set forth herein, alternatives and modifications will be apparent from the above description to those of skill in the art. These and other alternatives are considered equivalents and within the spirit and scope of this disclosure and the appended claims.

What is claimed is:

1. A method for providing cruise control for a machine having retarding and accelerating user interface elements for use by an operator, the method comprising:
    receiving an activation of a machine cruise control system and a setting of a target speed for the machine, and in response to receipt of the activation of the machine cruise control system and the setting of a target speed maintaining the machine speed at the target speed;
    detecting that the operator of the machine is actuating the retarding user interface element;
    in response to detecting that the operator of the machine is actuating the retarding user interface element, slowing the machine below the target speed by an amount based on an extent to which the operator of the machine has actuated the retarding user interface element; and
    detecting that the operator of the machine is no longer actuating the retarding user interface element and in response to detecting that the operator of the machine is no longer actuating the retarding user interface element returning the machine speed to the target speed.

2. The method for providing cruise control for a machine having retarding and accelerating user interface elements for use by an operator according to claim 1, wherein the retarding user interface element is a retarding lever.

3. The method for providing cruise control for a machine having retarding and accelerating user interface elements for use by an operator according to claim 1, wherein slowing the machine below the target speed by an amount based on an extent to which the operator of the machine has actuated the retarding user interface element comprises slowing the machine below the target speed by an amount proportional to the extent to which the operator of the machine has actuated the retarding user interface element.

4. The method for providing cruise control for a machine having retarding and accelerating user interface elements for use by an operator according to claim 1, further comprising:
    detecting that the operator of the machine is actuating the accelerating user interface element;
    in response to detecting that the operator of the machine is actuating the accelerating user interface element, increasing the machine speed above the target speed by an amount based on an extent to which the operator of the machine has actuated the accelerating user interface element; and
    detecting that the operator of the machine is no longer actuating the accelerating user interface element and in response to detecting that the operator of the machine is no longer actuating the accelerating user interface element returning the machine speed to the target speed.

5. The method for providing cruise control for a machine having retarding and accelerating user interface elements for use by an operator according to claim 1, wherein increasing the machine speed above the target speed by an amount based on an extent to which the operator of the machine has actuated the accelerating user interface element comprises increasing the machine speed above the target speed by an amount proportional to the extent to which the operator of the machine has actuated the accelerating user interface element.

6. The method for providing cruise control for a machine having retarding and accelerating user interface elements for use by an operator according to claim 4, wherein the accelerating user interface element is an acceleration pedal.

7. The method for providing cruise control for a machine having retarding and accelerating user interface elements for use by an operator according to claim 1, wherein the machine is a hybrid machine having one or more electric motor drives and wherein slowing the machine below the target speed comprises causing the one or more electric motor drives to act as generators to generate electrical power.

8. The method for providing cruise control for a machine having retarding and accelerating user interface elements for use by an operator according to claim 7, wherein the generated electrical power is stored.

9. The method for providing cruise control for a machine having retarding and accelerating user interface elements for use by an operator according to claim 7, wherein the generated electrical power is dissipated.

10. The method for providing cruise control for a machine having retarding and accelerating user interface elements for use by an operator according to claim 1, wherein receiving an activation of a machine cruise control system and a setting of a target speed for the machine comprises receiving an activation of the machine cruise control system while the machine is travelling at the target speed.

11. The method for providing cruise control for a machine having retarding and accelerating user interface elements for use by an operator according to claim 1, wherein the machine further includes a service brake and wherein activation of the service brake serves to deactivate the cruise control system.

12. A system for providing cruise control for a machine comprising:
    a retarding lever for slowing the machine and a throttle pedal for accelerating the machine;
    a user interface module configured to allow an operator to activate or deactivate a cruise control mode; and
    a cruise control module configured to maintain a speed of the machine substantially at a target speed when cruise control mode is activated except when the operator depresses one of the retarding lever and the throttle pedal, and when the operator depresses the retarding lever, slowing the machine below the target speed, and returning the machine to the target speed when the operator releases the retarding lever, and when the operator depresses the throttle pedal, accelerating the machine above the target speed, and returning the machine to the target speed when the operator releases the throttle pedal.

13. The system for providing cruise control for a machine in accordance with claim 12, wherein the user interface module is further configured to allow the operator to set the target speed.

14. The system for providing cruise control for a machine in accordance with claim 12, further comprising a speed sensor module linked to the cruise control module and configured to sense the machine speed.

15. The system for providing cruise control for a machine in accordance with claim 12, wherein slowing the machine below the target speed includes slowing the machine by an amount based on an extent that the operator depressed the retarding lever.

16. The system for providing cruise control for a machine in accordance with claim 15, wherein slowing the machine by an amount based on an extent that the operator depressed the retarding lever includes slowing the machine by an amount proportional to the extent that the operator depressed the retarding lever.

17. The system for providing cruise control for a machine in accordance with claim 12, wherein accelerating the machine above the target speed includes accelerating the machine by an amount based on an extent that the operator depressed the throttle pedal.

18. A method of controlling a machine speed while in cruise control, the method comprising:
    maintaining a speed of the machine at a target speed in the absence of an acceleration or deceleration command from an operator of the machine; and
    receiving a deceleration command from the operator of the machine and slowing the machine below the target speed while the deceleration command is received and returning the machine to the target speed when the deceleration command is no longer received.

19. The method of controlling a machine speed while in cruise control in accordance with claim 18, further comprising receiving an acceleration command from the operator of the machine and accelerating the machine above the target speed while the acceleration command is received and returning the machine to the target speed when the acceleration command is no longer received.

20. The method of controlling a machine speed while in cruise control in accordance with claim 18, wherein receiving a deceleration command from the operator of the machine comprises receiving an indication that the operator has depressed a retarding lever.

* * * * *

UNITED STATES PATENT AND TRADEMARK OFFICE
CERTIFICATE OF CORRECTION

| | | |
|---|---|---|
| PATENT NO. | : 8,668,625 B1 | Page 1 of 1 |
| APPLICATION NO. | : 13/644956 | |
| DATED | : March 11, 2014 | |
| INVENTOR(S) | : Bell et al. | |

It is certified that error appears in the above-identified patent and that said Letters Patent is hereby corrected as shown below:

In the Specification

Column 4, line 2, delete "speed; then" and insert -- speed, then --.

Signed and Sealed this
Fifteenth Day of September, 2015

Michelle K. Lee
*Director of the United States Patent and Trademark Office*